350-168
SEARCH ROOM

Sept. 15, 1970 R. R. AUSTIN 3,528,726

NARROW BAND INTERFERENCE LIGHT FILTER

Filed July 10, 1969

INVENTOR.
Robert R. Austin
BY
Irving M. Kriegsman
ATTORNEY.

United States Patent Office 3,528,726

Patented Sept. 15, 1970

3,528,726

NARROW BAND INTERFERENCE LIGHT FILTER

Robert R. Austin, Wilton, Conn., assignor to The Perkin-Elmer Corporation, Norwalk, Conn., a corporation of New York Continuation-in-part of application Ser. No. 829,328, June 2, 1969. This application July 10, 1969, Ser. No. 843,912

Int. Cl. G02b 5/28

U.S. Cl. 350—166 6 Claims

ABSTRACT OF THE DISCLOSURE

An interference type light filter made up of four sections arranged in a stack on one end of a substrate. The first and fourth sections in the stack are identical reflectors and are either single metallic coatings with a dielectric overcoating or all dielectric systems. The second and third sections in the stack are multilayer dielectric systems. The filter provides a single narrow transmission passband over a relatively large spectral region.

Figure 1:
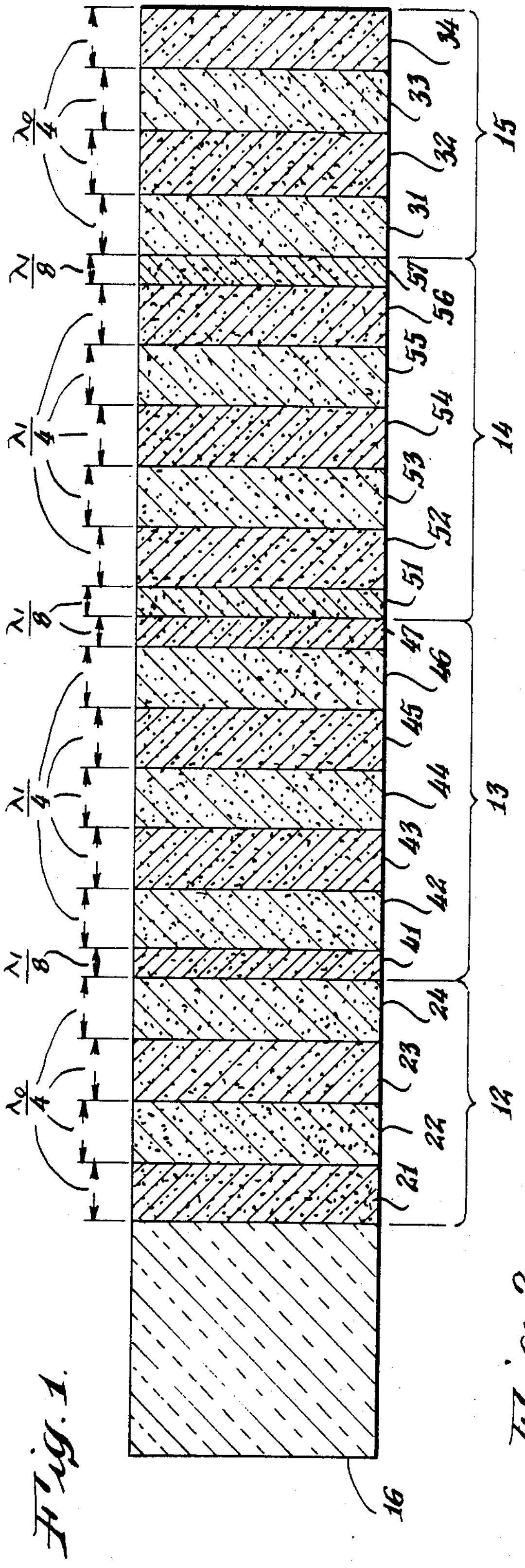

This application is a continuation-in-part of my copending application Ser. No. 829,328, filed June 2, 1969 and assigned to the assignee of this application, now abandoned.

This invention relates to light filters. More particularly, this invention relates to narrow band interference type light filters.

Interference type light filters capable of providing relatively narrow transmission passbands are now well known in the art.

The Lyot filter, which consists essentially of a plurality of birefringent crystal plates of different thicknesses, is an example of one known type of narrow band interference light filter.

The Fabry-Perot filter, which consists essentially of two spaced apart reflectors, is an example of another known type of narrow band interference light filter. In the conventional Fabry-Perot type interference filter, the two reflectors are separated by a single homogeneous medium, which is usually an air space or a layer of dielectric material. In U.S. Pat. 3,039,362, however, there is disclosed a Fabry-Perot type interference filter in which the single homogeneous medium is a sheet of mica, and in my copending application, Ser. No. 709,661, filed on Mar. 1, 1968, there is disclosed a Fabry-Perot type interference filter in which the single homogeneous medium is solid glass.

For many applications, a light filter that will provide only a single narrow transmission passband is either desired or required. One of the disadvantages of the Lyot filter is that it is an extremely delicate device. Another disadvantage of the Lyot filter is that it provides low values of total peak transmission. One of the disadvantages of the Fabry-Perot filter is that it produces a plurality of transmission passbands and not merely a single transmission passband. Consequently, if only a single transmission passband is desired and a Fabry-Perot type filter is used, additional or auxiliary filters are needed to eliminate all but the single desired transmission passband. The additional or auxiliary filters are independent in that they do not interact with the interference phenomena occurring in the main (Fabry-Perot) filter or in any way affect the output of the main filter, but simply produce one or more transmission bands positioned in the spectrum such that when light passes through both the auxiliary filter and the main filter, only light over one of the transmission bands produced by the main filter will be transmitted.

Accordingly, it is an object of this invention to provide a new and improved light filter.

It is another object of this invention to provide a new and improved narrow band light filter.

It is still another object of this invention to provide a new and improved interference type light filter.

It is yet still another object of this invention to provide a new and improved narrow band interference filter for use in modifying the spectral composition of light.

It is another object of this invention to provide a new and improved light filter which provides only a single narrow transmission passband over a relatively large spectral range.

The above and other objects are achieved by constructing a filter according to this invention.

Basically, the filter is made up of four sections arranged in a stack.

The first and fourth sections (i.e., the two outer sections of the stack) are identical reflective systems optimized for maximum reflection at a wavelength $\lambda_o$, the desired wavelength at the peak of the desired transmission passband.

The second and third sections (i.e., the two inner sections of the stack) are multilayer dielectric systems having the same optical thickness. Both sections consist of a combination of layers of a dielectric material (or mixture) having a high index of refraction and a dielectric material (or mixture) having a low index of refraction. One of the sections comprises one or several repeated groups of the layer of high index material having a thickness $$P_1 \frac{\lambda_1}{8}$$

where $P_1$ is an odd integer, the layer of low index material having a thickness of $$P_1 \frac{\lambda_1}{4}$$

and the layer of high index material having a thickness of $$P_1 \frac{\lambda_1}{8}$$

The other section comprises the same number of groups of the layer of low index material having a thickness of $$P_1 \frac{\lambda_1}{8}$$

the layer of high index material having a thickness of $$P_1 \frac{\lambda_1}{4}$$

and the layer of low index material having a thickness of $$P_1 \frac{\lambda_1}{8}$$

The relationship between $\lambda_0$ and $\lambda_1$ is as follows:

$$\lambda_o = \frac{\lambda_1 \frac{\pi}{2}}{\text{arc cos}\left(\frac{H_2 - L_2}{H_2 + L_2}\right)^2}$$

where:

$H_2$ is the index of refraction of the material in the high index layer, and $L_2$ is the index of refraction of the material in the low index layer.

The distance between the two outer sections is dependent on the number of groups in the two inner sections and is equal to the sum of the optical thickness of the two inner sections. The distance is never equal to an integral number of half wavelengths $\lambda_o$ as in the Fabry-Perot filter.

The two outer sections may be either multilayer dielectric systems such as, for example, alternate layers of a high index material and a low index material with each layer having a thickness of $$P_o\frac{\lambda_o}{4}$$

where $P_o$ is an odd integer, or single metallic coatings with dielectric overcoatings such that the phase relationships of incident and reflected energies are some multiple of half wavelengths at $\lambda_o$.

If the two outer sections are multilayer dielectric systems, the indices of the high and low index materials used in these sections may be the same as the indices of the high and low index materials used in the two inner sections or may be different. Increasing the ratio of the two indices of refraction of the high and low index materials used in either the two outer sections or the two inner sections decreases the transmission passband width. Increasing the number of groups in either the two inner or the two outer sections also decreases the transmission passband width.

Figure 2:
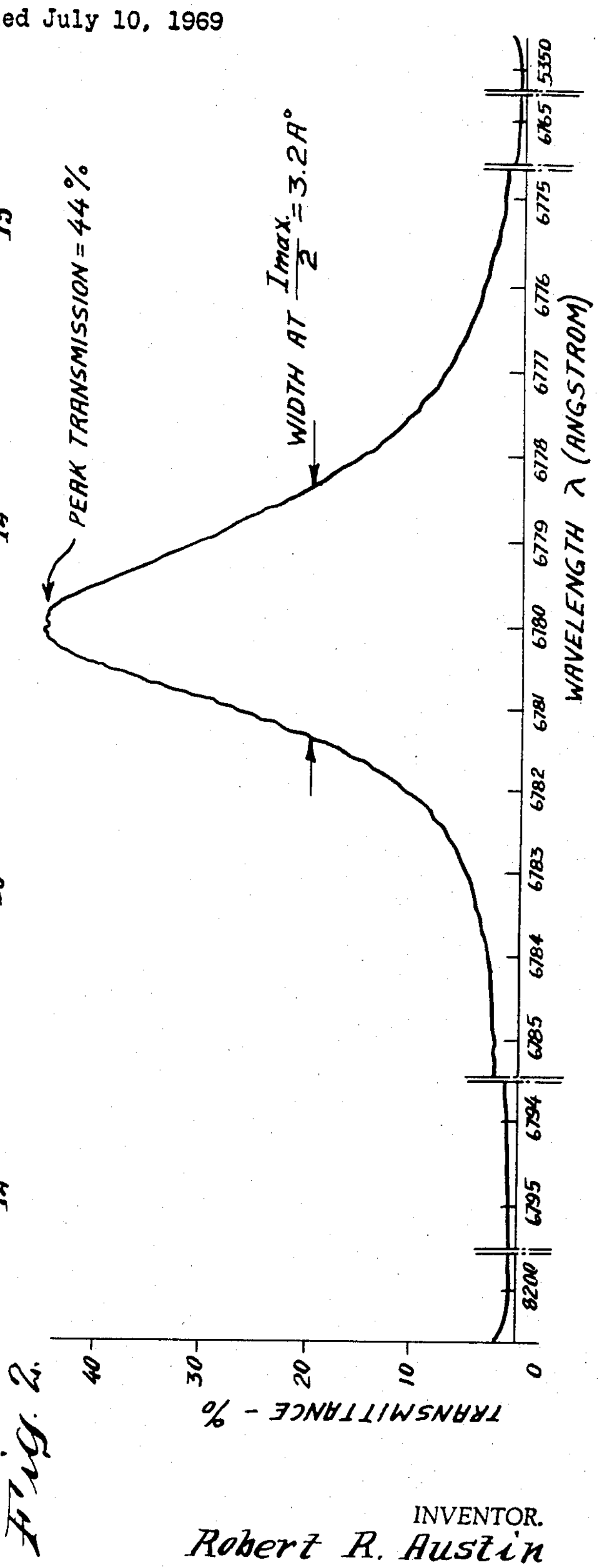

Other features and advantages of the invention will become apparent from the following detailed description taken in conjunction with the drawings in which:

FIG. 1 is a cross section of a filter constructed in accordance with this invention, the thickness of the layers being greatly exaggerated for purposes of illustration; and FIG. 2 is a transmission curve obtained from a filter actually constructed according to this invention.

Referring now to FIG. 1, there is shown a cross section of a filter 11 constructed according to this invention. The filter 11 includes four sections, 12, 13, 14 and 15, arranged in a stack and mounted on one end of a substrate 16. The filter 11 shown in FIG. 1 is an all dielectric version insofar as all four sections consist of multilayer dielectric coatings.

Sections 12 and 15 are identical multilayer dielectric reflective systems optimized for reflection at a desired wavelength $\lambda_o$, the layers in section 15 being arranged in the reverse order from section 12 so that it is, in effect, a mirror image of section 12. Section 12 is made up of four layers, 21, 22, 23 and 24. Each layer has an optical thickness of $\lambda_o/4$. Layers 21 and 23 are made of a material having a high index of refraction $H_1$ and layers 23 and 24 are made up of a material having a low index of refraction $L_1$. Layers 21 and 22 together form one group and layers 23 and 24 together form another group. Thus, section 12 consists of two, two layer groups. Section 15 is also made up of four layers identified 31, 32, 33 and 34 with the optical thickness and index of refraction of layers 31 through 34 corresponding to the optical thickness and index of refraction of layers 21 through 24 respectively.

Section 13 is made up of seven layers identified as 41 through 47. Layers 41, 43, 45 and 47 are made up of a material having a high index of refraction $H_2$. Layers 42, 44 and 46 are made up of a material having a low index of refraction $L_2$. $H_2$ and $L_2$ may, if desired, be equal to $H_1$ and $L_1$ respectively. The optical thickness of layers 41 and 47 is $\lambda_1/8$. The optical thickness of layers 42 through 46 is $\lambda_1/4$.

Although section 13, as shown in FIG. 1 in the drawings, contains only seven layers, it is, in effect, three repeated groups consisting of three layers per group in which the first and third layers of each group have an optical thickness of $\lambda_1/8$ and are made of a material having a high index of refraction of $H_2$, and the second layer in each group is made up of a layer having an optical thickness of $\lambda_1/4$ and made of a material having a low index of refraction $L_2$. Because the first and third layers in each group are identical as to thickness and index of refraction, when the groups are arranged in repeating order the last layer of one group and the first layer of the next group are both high index layers having an optical thickness of $\lambda_1/8$, and thus together form a single layer of high index material having a thickness of $\lambda_1/4$.

Section 14 is made up of seven layers identified 51 through 57. Layers 51, 53, 55 and 57 are made up of a material having a low index of refraction $L_2$. Layers 52, 54 and 56 are made up of a material having a high index of refraction $H_2$. The optical thickness of layers 51 and 57 is $\lambda_1/8$. The optical thickness of layers 52 through 56 is $\lambda_1/4$.

As is the case in section 13, section 14 is also, in effect, three groups of layers with three layers in each group. The thickness of the layers in section 14 is in the same order as the thickness in section 13. However, in section 14, the order of layers in each group is low index, high index and low index, rather than high index, low index and high index as in section 13. The relationship between $\lambda_o$ and $\lambda_1$ is as follows:

$$\lambda_o=\frac{\lambda_1\frac{\pi}{2}}{\text{arc cos}\left(\frac{H_2-L_2}{H_2+L_2}\right)^2}$$

The choice materials for the substrate 16 and the high and low index layers in all four sections, 12 through 15, is, of course, a matter of choice depending on the location in the spectrum of the desired transmission passband. For example, if the desired transmission passband is in the visible portion of the spectrum, a typical substrate material that can be used is borosylicate crown glass having an index of refraction of 1.52, a typical high index material that can be used for all four sections is zinc sulphide having an index of refraction of 2.35 and a typical low index material that can be used for all four sections is cryolite having an index of refraction of 1.35.

The transmission passband produced by this filter peaks at the wavelength $\lambda_o$.

Using standard thin film notation as described in chapter 20 pages 5 and 6 of the Military Standardization Handbook on Optical Design (MIL HDBK–141) published by the U.S. Department of Defense, Defense Supply Agency on Oct. 5, 1962, the design formula for the filter is:

$$(H_1L_1)^q\left(\frac{H_2}{2}L_2\frac{H_2}{2}\right)^m\left(\frac{L_2}{2}H_2\frac{L_2}{2}\right)^m(L_1H_1)^q$$

where:

$q$ and $m$ are integers but never zero;

$H_1$ is a layer of high index material having an optical thickness of $\lambda_o/4$;

$L_1$ is a layer of low index material having an optical thickness of $\lambda_o/4$;

$H_2$ is a layer of high index material having an optical thickness of $\lambda_1/4$;

$L_2$ is a layer of low index material having an optical thickness of $\lambda_1/4$;

where:

$$\lambda_o=\frac{\lambda_1\frac{\pi}{2}}{\text{arc cos}\left(\frac{n_2-n_2}{n_2+n_2}\right)^2}$$

where:

$n_1$=index of $H_2$ $n_2$=index of $L_2$

Referring now to FIG. 2, there is shown a chart of transmittance versus wavelength for a filter that was actually constructed according to this invention. The filter was an all dielectric version. Sections 12 and 15 each consisted of three, two layer groups for a total of six layers. Sections 13 and 14 each consisted of four, three layer groups for a total of nine layers. The substrate was made of borosylicate crown glass having an index of refraction of 1.52. The high index of refraction material used in all four sections was zinc sulphide having an index of refraction of 2.35. The index of refraction of low index material used in all four sections was cryolite having an index of refraction of 1.35. The design wavelength $\lambda_o$ was 6780 A. As can be seen from the chart, the filter produced a transmission passband peak of 44% at 6780 A., had a half passband width of 3.2 A. and produced less than 0.1% transmittance from 5350 A. to 6765 A. on the short side of the peak and from 6795 A. to 8200 A. on the long side of the peak.

The underlying theory of how the filter functions is as follows: The two inner sections, containing the $\lambda_1/8$, $\lambda_1/4$, $\lambda_1/8$ groupings, have an equivalent refractive index which goes in one case from zero to plus infinity and in the other case from minus infinity to zero, in the region in which the stacks exhibit strong reflection. As the locations of these two strong reflection bands are designed to be identical, there is, therefore, a wavelength at which the equivalent indices of these sections are equal in magnitude but opposite in sign. This is the wavelength $\lambda_o$.

At $\lambda_o$, therefore, the two inner sections effectively cancel and allow the outer sections to interact. If the inner sections were to be removed, the remaining layer arrangement would be similar structurally to that of a single order Fabry-Perot filter with a peak transmission at $\lambda_o$. However, as is evident, the filter of this invention is much more highly selective than the Fabry-Perot filter and regardless of what the total separation of the outer sections is, there is only a single transmission peak and not a plurality of peaks. It should also be noted that unlike the Fabry-Perot filter, the separation of the outer reflectors of the filter of this invention is never an integral number of half waves thick at $\lambda_o$.

What is claimed is:

1. An interference light filter adapted to produce a single narrow transmission passband at a wavelength $\lambda_o$ comprising:

(a) a substrate; and (b) four reflective systems arranged in a stack and mounted on one end of the substrate; the first and fourth systems being identical and optimized for reflection at $\lambda_o$; the second and third systems each comprising alternate layers of a high and low index material, the total optical thickness of the second and third systems being identical, one of the two systems comprising at least one group containing three layers in which the first layer is of a material having a low index of refraction and an optical thickness of $\lambda_1/8$, the second layer is of a material having a low index of refraction and an optical thickness of $\lambda_1/4$, and the third layer is of material having a high index of refraction and an optical thickness of $\lambda_1/8$, and the other of the two systems comprising the same number of three layer groups in which the first layer is of a material having a low index of refraction and an optical thickness of $\lambda_1/8$, the second layer is of a material having a high index of refraction and an optical thickness of $\lambda_1/4$, and the third layer is of a material having a low index of refraction and an optical thickness of $\lambda_1/8$, wherein:

$$\lambda_o = \frac{\lambda_1 \frac{\pi}{2}}{\text{arc cos}}\left(\frac{H_2-L_2}{H_2+L_2}\right)^2$$

wherein $H_2$ is the index of refraction of the high index material and $L_2$ is the index of refraction of the low index material.

2. An all dielectric narrow band interference filter adapted to produce a single narrow transmission passband at a wavelength $\lambda_o$ comprising:

(a) a substrate; and (b) four multilayer dielectric systems arranged in a stack and mounted on one side of the substrate;

($b_1$) the first system comprising $n_1$ groups of a layer of material having a high index of refraction $H_1$ and an optical thickness of $\lambda_o/4$ and a layer of material having a low index of refraction $L_1$ and an optical thickness of $\lambda_o/4$;

($b_2$) the second system comprising $n_2$ groups of a layer of material having a high index of refraction $H_2$ and an optical thickness of $\lambda_1/8$, a layer of material having a low index of refraction $L_2$ and an optical thickness of $\lambda_1/4$, and a layer of material having a high index of refraction $H_2$ and an optical thickness of $\lambda_1/8$;

($b_3$) the third system comprising $n_2$ groups of a layer of material having a low index of refraction $L_2$ and an optical thickness of $\lambda_1/8$, a layer of material having a high index of refraction $H_2$ and an optical thickness of $\lambda_1/4$, and a layer of material having a low index of refraction $L_2$ and an optical thickness of $\lambda_1/8$;

($b_4$) the fourth system comprising $n_1$ groups of a layer of material having a low index of refraction $L_1$ and an optical thickness of $\lambda_o/4$ and a layer of material having a high index of refraction $H_1$ and an optical thickness of $\lambda_o/4$;

wherein $n_1$ and $n_2$ are integers and wherein:

$$\lambda_o = \frac{\lambda_1 \frac{\pi}{2}}{\text{arc cos}}\left(\frac{H_2-L_2}{H_2+L_2}\right)^2$$

3. The filter according to claim 2 and wherein $H_1$ and $L_1$ are equal to $H_2$ and $L_2$ respectively.

4. The filter according to claim 2 and wherein $n_1=2$ and $n_2=3$.

5. The filter according to claim 2 and wherein $\lambda_o=$ 6780 A.

6. The filter according to claim 2 and wherein the high index material used in all four systems is zinc sulphide having an index of refraction of 2.35, the low index material used in all four systems is cryolite having an index of refraction of 1.35 and the substrate is crown glass having an index of refraction of 1.52.

References Cited

UNITED STATES PATENTS 2,624,238 1/1953 Widdop et al. ---- 350—166 X

OTHER REFERENCES

Military Standardization Handbook on Optical Design (MIL HDBK-141) published by the U.S. Dept. of Defense, Defense Supply Agency on Oct. 5, 1962.

DAVID SCHONBERG, Primary Examiner

T. H. KUSMER, Assistant Examiner

UNITED STATES PATENT OFFICE

CERTIFICATE OF CORRECTION

Patent No. 3,528,726 Dated September 15, 1970

It is certified that error appears in the above-identified patent and that said Letters Patent are hereby corrected as shown below:

Claim 1, line 14, before "index" delete "low" and substitute --high--.

NOV. 17,1970

(SEAL)
Attest:

Edward M. Fletcher, Jr.
Attesting Officer

WILLIAM E. SCHUYLER, JR.
Commissioner of Patents

UNITED STATES PATENT OFFICE

CERTIFICATE OF CORRECTION

Patent No. 3,528,726 Dated September 15, 1970

It is certified that error appears in the above-identified patent and that said Letters Patent are hereby corrected as shown below:

Column 4 lines 57 to 60 in the formula set forth change the expression within the parentheses to -- $\frac{n_1-n_2}{n_1+n_2}$ --.

Claim 1 line 14 before "index" delete "low" and substitute --high--.

SIGNED AND SEALED
JAN 5 1971

(SEAL)
Attest:

Edward M. Fletcher, Jr.
Attesting Officer

WILLIAM E. SCHUYLER, JR.
Commissioner of Patents